(12) United States Patent
Song et al.

(10) Patent No.: US 11,874,668 B2
(45) Date of Patent: Jan. 16, 2024

(54) ELECTRONIC APPARATUS AND METHOD OF CONTROLLING THEREOF

(71) Applicant: Samsung Electronics Co., Ltd., Suwon-si (KR)

(72) Inventors: Sukhoon Song, Suwon-si (KR); Kyongsu Kim, Suwon-si (KR); Injoo Kim, Suwon-si (KR); Dongmin Shin, Suwon-si (KR); Shin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 17/117,692

(22) Filed: Dec. 10, 2020

(65) Prior Publication Data

US 2021/0200234 A1    Jul. 1, 2021

(30) Foreign Application Priority Data

Dec. 27, 2019    (KR) .................. 10-2019-0177124

(51) Int. Cl.
G05D 1/02    (2020.01)
A47L 9/00    (2006.01)

(52) U.S. Cl.
CPC ............ *G05D 1/0246* (2013.01); *A47L 9/009* (2013.01); *G05D 1/0238* (2013.01); *A47L 2201/04* (2013.01); *G05D 2201/0215* (2013.01)

(58) Field of Classification Search
CPC ... A47L 9/009; A47L 2201/04; G05D 1/0238; G05D 2201/0215
See application file for complete search history.

(56) References Cited

U.S. PATENT DOCUMENTS 10,852,729 B2    12/2020    Choi et al.
11,029,700 B2    6/2021    Shin et al.
(Continued)

FOREIGN PATENT DOCUMENTS

CN    110936370 A    3/2020
CN    111700546 A  *  9/2020  .............. A47L 11/24
(Continued)

OTHER PUBLICATIONS

JP-4555035-B2—English Machine Translation (Year: 2010).*
(Continued)

*Primary Examiner* — Marc Carlson
(74) *Attorney, Agent, or Firm* — Jefferson IP Law, LLP

(57) ABSTRACT

A robot vacuum cleaner is provided. The robot vacuum cleaner includes a camera, a memory configured to store an artificial intelligence model trained to identify an image from an input image and shape information corresponding to each of a plurality of objects, and a processor configured to control the electronic apparatus by being connected to the camera and the memory, wherein the processor is configured to input an image obtained by the camera to the artificial intelligence model to identify an object included in the image, obtain shape information corresponding to the identified object among the plurality of shape information stored in the memory, and set a traveling path of the robot vacuum cleaner based on the shape information and size information related to the object.

18 Claims, 13 Drawing Sheets

(56) References Cited

U.S. PATENT DOCUMENTS

| | | | |
|---|---|---|---|
| 2013/0206177 A1* | 8/2013 | Burlutskiy | A47L 11/4061 |
| | | | 15/319 |
| 2017/0090456 A1* | 3/2017 | Mao | G05B 19/404 |
| 2018/0210445 A1* | 7/2018 | Choi | G05D 1/0238 |
| 2018/0210452 A1* | 7/2018 | Shin | A47L 9/2805 |
| 2018/0289225 A1* | 10/2018 | Izawa | G05D 1/0255 |
| 2018/0348783 A1* | 12/2018 | Pitzer | A47L 9/2889 |
| 2018/0353042 A1* | 12/2018 | Gil | A47L 9/2826 |
| 2019/0025838 A1* | 1/2019 | Artes | G05D 1/0274 |
| 2019/0213438 A1* | 7/2019 | Jones | G05D 1/0274 |
| 2019/0332119 A1* | 10/2019 | Kim | G06V 20/10 |
| 2020/0008639 A1* | 1/2020 | Lee | A47L 9/2894 |
| 2020/0012292 A1* | 1/2020 | Park | G05D 1/0253 |
| 2021/0087031 A1* | 3/2021 | Lunscher | G06T 7/10 |

FOREIGN PATENT DOCUMENTS

| | | | |
|---|---|---|---|
| EP | 2 423 893 B1 | 4/2013 | |
| EP | 3 508 937 A1 | 7/2019 | |
| EP | 3508937 A1 * | 7/2019 | A47L 11/28 |
| JP | 2004-033340 A | 2/2004 | |
| JP | 4555035 B2 * | 9/2010 | |
| KR | 10-1772084 B1 | 8/2017 | |
| KR | 10-2018-0075176 A | 7/2018 | |
| KR | 10-2018-0087798 A | 8/2018 | |
| KR | 10-2018-0134230 A | 12/2018 | |
| KR | 10-2019-0106891 A | 9/2019 | |
| KR | 10-2017148 B1 | 9/2019 | |
| KR | 10-2019-0123366 A | 11/2019 | |
| WO | 2014/196272 A1 | 12/2014 | |

OTHER PUBLICATIONS

Extended European Search Report dated Sep. 29, 2022, issued in European Patent Application No. 20908344.3-1016.
International Search Report and Written Opinion dated Mar. 9, 2021, issued in International Patent Application No. PCT/KR2020/017956.

* cited by examiner

| OBJECT | IMAGE | SHAPE | CAUSE OF CONTAMINATION | CLIMBING |
|---|---|---|---|---|
| SOCKS |  | ATYPICAL SHAPE | X | O |
| BOTTLE |  | TYPICAL SHAPE (ROUND) | X | X |
| TOWEL |  | ATYPICAL SHAPE | X | O |
| RUG |  | ATYPICAL SHAPE | X | O |
| CUP |  | TYPICAL SHAPE (ROUND) | X | X |
| PLATE |  | TYPICAL SHAPE (ROUND) | X | X |

FIG. 9

| AIR CONDITIONER | REFRIGERATOR | TV | BED | SOFA | BOOKSHELF | ESTIMATED AREA |
|---|---|---|---|---|---|---|
| X | X | X | X | X | O | STUDY ROOM |
| X | X | X | X | O | X | LIVING ROOM |
| X | X | X | O | X | X | BED ROOM |
| X | X | O | X | X | X | LIVING ROOM |
| X | O | X | X | X | X | KITCHEN |
| O | X | X | X | X | X | LIVING ROOM |
| X | X | X | X | X | O | STUDY ROOM |
| X | X | X | X | O | O | ROOM |
| X | X | X | O | X | O | BED ROOM |
| X | X | O | X | X | O | LIVING ROOM |
| X | X | O | X | O | X | LIVING ROOM |

ELECTRONIC APPARATUS AND METHOD OF CONTROLLING THEREOF

CROSS-REFERENCE TO RELATED APPLICATION(S)

This application is based on and claims priority under 35 U.S.C. § 119(a) of a Korean patent application number 10-2019-0177124, filed on Dec. 27, 2019 in the Korean Intellectual Property Office, the disclosure of which is incorporated by reference herein in its entirety.

BACKGROUND

1. Field

The disclosure relates to a robot vacuum cleaner and a method of controlling thereof. More particularly, the disclosure relates to a robot vacuum cleaner for setting a traveling path of the robot vacuum cleaner and a method of driving thereof.

2. Description of the Related Art

Robot vacuum cleaners may be apparatuses which automatically clean a n area to be cleaned by sucking foreign materials while driving the area to be cleaned by itself without the user operation.

The robot vacuum cleaner is equipped with various sensors to accurately and efficiently detect obstacles scattered in a driving direction. A sensor provided in the robot vacuum cleaner detect positions and distances of obstacles, and the robot vacuum cleaner determines a moving direction using a result of sensing.

Research has been conducted only on a method of recognizing various types of obstacles in the home, and research on a specific method of recognizing obstacles and using it to set a traveling path of a robot vacuum cleaner is insufficient.

In particular, there is a demand for recognizing an obstacle and setting an optimized traveling path of the robot vacuum cleaner in consideration of a shape of the obstacle.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a robot vacuum cleaner that identifies an obstacle and set a traveling path of the robot vacuum cleaner, and a method of controlling thereof.

Additional aspects will be set forth in part in the description which follows and, in part, will be apparent from the description, or may be learned by practice of the presented embodiments.

In accordance with an aspect of the disclosure, a robot vacuum cleaner is provided. The robot vacuum cleaner includes a camera, a memory configured to store an artificial intelligence model trained to identify an image from an input image and shape information corresponding to each of a plurality of objects, and a processor configured to control the electronic apparatus by being connected to the camera and the memory, wherein the processor is configured to input an image obtained by the camera to the artificial intelligence model to identify an object included in the image, obtain shape information corresponding to the identified object among the plurality of shape information stored in the memory, and set a traveling path of the robot vacuum cleaner based on the shape information and size information related to the object.

The memory may be configured to further store size information for each of the shape information, and wherein the processor is configured to obtain size information corresponding to the shape information based on the image, or obtain size information corresponding to the shape information based on the size information stored in the memory.

The processor may be configured to identify a plan shape corresponding to the object based on the shape information of the object, and set the traveling path for avoiding the object based on the plan shape of the object.

The cleaner may further include an obstacle detecting sensor, wherein the processor is configured to set the traveling path for avoiding the object based on sensing data of the obstacle detecting sensor, based on the plan view corresponding to the object being failed to be obtained.

The memory may be configured to further store information on whether there is an object to avoid for each of the plurality of objects, wherein the processor is configured to set the traveling path to climb the object, based on the object being identified not to avoid based on the information on whether there is an object to avoid.

The processor may be configured to stop a suction operation of the robot vacuum cleaner while climbing the object.

The memory may be configured to further store first weight value information for each object corresponding to a first area, and second weight value information for each object corresponding to a second area, wherein the processor is configured to, based on a plurality of objects being identified from the image obtained by the camera, apply the first weight value information to each of the plurality of objects to obtain first area prediction information, apply the second weight value information to each of the plurality of objects to obtain second area prediction information, and identify an area in which the robot vacuum cleaner is located as any one of the first area or the second area based on the first area prediction information and the second area prediction information.

The cleaner may further include a communication interface, wherein the processor is configured to, based on the area in which the robot vacuum cleaner is located being identified any one of the first area or the second area, control the communication interface to transmit identification information on the identified area, a plan view of the identified area, a plan shape corresponding to each of the plurality of objects located in the area to an external server.

The processor may be configured to, based on a user command that indicates an object being received, identify an object corresponding to the user command among the objects identified from the image, and drive the robot vacuum cleaner such that the cleaner moves to a location of the identified object based on a plan view with respect to the area in which the robot vacuum cleaner is located and a plan shape with respect to at least one object located in the area.

The processor may be configured to obtain shape information corresponding to the identified object among the shape information stored in the memory, and set a traveling path for cleaning surroundings of the object based on the shape information and size information related to the object.

In accordance with another aspect of the disclosure, a method of controlling a robot vacuum cleaner is provided. The robot vacuum cleaner includes an artificial intelligence model trained to identify an object from an input image, the method includes inputting an image obtained by a camera to the artificial intelligence model to identify an object included in the image, obtaining shape information corresponding to the identified object among the plurality of shape information, and setting a traveling path of the robot vacuum cleaner based on the shape information and size information related to the object.

The robot vacuum cleaner may be configured to further include size information for each of the shape information, and wherein the obtaining the shape information includes obtaining size information corresponding to the shape information based on the image, or obtaining size information corresponding to the shape information based on the size information stored in the memory.

The setting the traveling path may include identifying a plan shape corresponding to the object based on the shape information of the object, and setting the traveling path for avoiding the object based on the plan shape of the object.

The setting the traveling path may include setting the traveling path for avoiding the object based on sensing data of an obstacle detecting sensor, based on the plan view corresponding to the object being failed to be obtained.

The robot vacuum cleaner may be configured to further include information on whether there is an object to avoid for each of the plurality of objects, and wherein the setting the traveling path includes setting the traveling path to climb the object, based on the object being identified not to avoid based on the information on whether there is an object to avoid.

The method may further include stopping a suction operation of the robot vacuum cleaner while climbing the object.

The robot vacuum cleaner may be configured to further store first weight value information for each object corresponding to a first area, and second weight value information for each object corresponding to a second area, and wherein the robot vacuum cleaner further includes, based on a plurality of objects being identified from the image obtained by the camera, applying the first weight value information to each of the plurality of objects to obtain first area prediction information, applying the second weight value information to each of the plurality of objects to obtain second area prediction information, and identifying an area in which the robot vacuum cleaner is located as any one of the first area or the second area based on the first area prediction information and the second area prediction information.

The method may further include, based on the area in which the robot vacuum cleaner is located being identified any one of the first area or the second area, transmitting identification information on the identified area, a plan view of the identified area, a plan shape corresponding to each of the plurality of objects located in the area to an external server.

The method may further include, based on a user command that indicates an object being received, identifying an object corresponding to the user command among the objects identified from the image, and driving the robot vacuum cleaner such that the cleaner moves to a location of the identified object based on a plan view with respect to the area in which the robot vacuum cleaner is located and a plan shape with respect to at least one object located in the area.

The method may further include obtaining shape information corresponding to the identified object among the shape information stored in the memory, and setting a traveling path for cleaning surroundings of the object based on the shape information and size information related to the object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a view illustrating a method of acquiring information on a space in which a robot vacuum cleaner is located according to an embodiment of the disclosure;

Throughout the drawings, like reference numerals will be understood to refer to like parts, components, and structures.

DETAILED DESCRIPTION

Figure 1:
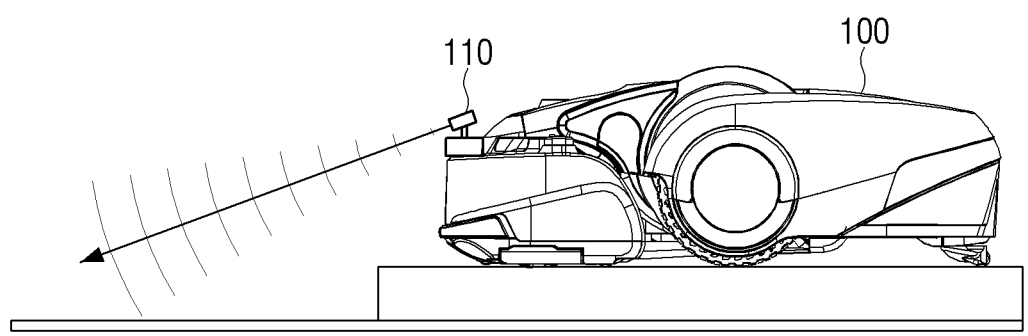
FIG. 1 is a view illustrating a robot vacuum cleaner according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. It should be apparent to skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", and "may include" used in the embodiments of the disclosure indicate the presence of corresponding features (e.g., elements such as numerical values, functions, operations, or parts), and do not preclude the presence of additional features.

In the description, the term "at least one of A or/and B" is to be understood as representing either "A" or "B" or "A and B".

The expression "1", "2", "first", or "second" as used herein may modify a variety of elements, irrespective of order and/or importance thereof, and only to distinguish one element from another. Accordingly, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element).

Singular forms are intended to include plural forms unless the context clearly indicates otherwise. The terms "include", "comprise", "is configured to," etc., of the description are used to indicate that there are features, numbers, operations, elements, parts or combination thereof, and they should not exclude the possibilities of combination or addition of one or more features, numbers, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

Also, the term "user" may refer to a person who uses an electronic apparatus or an apparatus (e.g., an artificial intelligence (AI) electronic apparatus) that uses the electronic apparatus.

Hereinafter, embodiments will be described in greater detail with reference to the accompanying drawings.

FIG. 1 is a view illustrating a robot vacuum cleaner according to an embodiment of the disclosure.

Referring to FIG. 1, the robot vacuum cleaner 100 refers to an apparatus driven by electric power and automatically sucks foreign materials. In FIG. 1, it is assumed that the robot vacuum cleaner 100 is implemented in a flat shape in close contact with a floor in order to suck foreign materials on the floor, but this is only an embodiment, and the robot vacuum cleaner 100 may be implemented in various shapes and sizes.

Referring to FIG. 1, the robot vacuum cleaner 100 according to an embodiment of the disclosure may include a camera 110 to detect an object located adjacent to the robot vacuum cleaner 100. For example, the robot vacuum cleaner 100 may obtain a front image of the robot vacuum cleaner 100 through the camera 110 and identify an object located in a driving direction of the robot vacuum cleaner 100 based on the obtained image. The object may refer to various objects or situations that may interfere with the driving of the robot vacuum cleaner 100 or cause a stop, damage, or failure of the robot vacuum cleaner 100 during driving. For example, when the robot vacuum cleaner 100 is driven in a home, objects may be various such as furniture, electric appliances, rugs, clothes, walls, stairs, thresholds, or the like.

The robot vacuum cleaner 100 according to an embodiment of the disclosure may set a traveling path or a moving path of the robot vacuum cleaner 100 based on information on the identified object. The information on the identified object may include shape (or form) information of the object and size information related to the object.

The robot vacuum cleaner 100 according to an embodiment may set a traveling path for avoiding a corresponding object while driving of the robot vacuum cleaner 100, a traveling path for climbing the corresponding object (e.g., climbing over objects), etc. based on information on the identified object.

Hereinafter, various embodiments of the disclosure in which the robot vacuum cleaner 100 sets a traveling path will be described.

Figure 2:
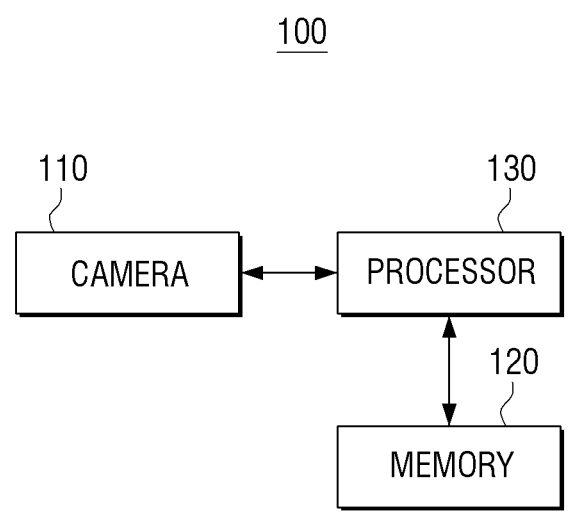
FIG. 2 is a block diagram illustrating a configuration of a robot vacuum cleaner according to an embodiment of the disclosure.

FIG. 2 is a block diagram illustrating a configuration of a robot vacuum cleaner according to an embodiment of the disclosure.

Referring to FIG. 2, the robot vacuum cleaner 100 according to an embodiment of the disclosure includes a camera 110, a memory 120, and a processor 130.

The camera 110 is a component for acquiring one or more images of the surroundings of the robot vacuum cleaner 100. The camera 110 may be implemented as a Red/Green/Blue (RGB) camera, a 3 dimensional (3D) camera, or the like.

Meanwhile, the robot vacuum cleaner 100 according to an embodiment of the disclosure may further include a detecting sensor (not shown) in addition to the camera 110, and the robot vacuum cleaner 100 may identify an object based on sensing data of the detecting sensor. For example, the detecting sensor may be implemented as an ultrasonic sensor, an infrared sensor, or the like. According to an embodiment, when the detecting sensor is implemented as an ultrasonic sensor, the robot vacuum cleaner 100 may control the ultrasonic sensor to emit ultrasonic pulses. Subsequently, when a reflected wave reflected from the object is transmitted to the ultrasonic pulses, the robot vacuum cleaner 100 may measure a distance between the object and the robot vacuum cleaner 100 by measuring an elapsed time between them. In addition, the ultrasonic sensor may be implemented in various ways, including an ultrasonic proximity sensor. The infrared sensor is a device that detects infrared light information possessed by an object. The robot vacuum cleaner 100 may identify an object based on infrared light information obtained through the infrared sensor.

Meanwhile, the disclosure is not limited thereto, and the detecting sensor may be implemented with various types of sensors. The robot vacuum cleaner 100 may analyze a presence or an absence of an object, a location of the object, a distance to the object, or the like based on sensing data of the detecting sensor, and may set a traveling path of the robot vacuum cleaner 100 based on a result of the analysis. For example, when it is identified that there is an object in front, the robot vacuum cleaner 100 may rotate the robot vacuum cleaner 100 itself to the right or left, or move backward.

The memory 120 may store a variety of data such as an O/S software module that drives the robot vacuum cleaner 100 and applications.

In particular, an artificial intelligence model may be stored in the memory 120. Specifically, the memory 120 according to an embodiment of the disclosure may store an artificial intelligence model trained to identify an object in an input image. The artificial intelligence model may be a model trained using a plurality of sample images including various objects. Identifying the object may be understood as acquiring information on the object, such as the name and type of the object. In this case, the information on the object may be information on the identified object that is output by the artificial intelligence model that identifies the corresponding object.

The artificial intelligence model according to an embodiment is a determination model trained based on a plurality of images based on an artificial intelligence algorithm, and may be a model based on a neural network. The trained determination model may be designed to simulate a human brain structure on a computer, and may include a plurality of network nodes having weights that simulate neurons of a human neural network. The plurality of network nodes may form a connection relationship, respectively, so as to simulate a synaptic activity of neurons that transmit and receive signals through synapses. In addition, the trained judgment model may include, for example, a machine learning model, a neural network model, or a deep learning model developed from the neural network model. The plurality of network nodes in a deep learning model may exchange data according to a convolutional connection relationship while being located at different depths (or layers).

As an example, the artificial intelligence model may be a convolutional neural network (CNN) model learned based on an image. The CNN is a multilayer neural network with a special connection structure designed for voice processing, image processing, or the like. Meanwhile, the artificial intelligence model is not limited to the CNN. For example, the artificial intelligence model may be implemented with at least one deep neural network (DNN) model among recurrent neural network (RNN), long short term memory network (LSTM), gated recurrent units (GRU), or generative adversarial networks (GAN).

The artificial intelligence model stored in the memory 120 may be learned through various learning algorithms such as the robot vacuum cleaner 100 or a separate server/system. The learning algorithm is a method in which a predetermined target device (e.g., a robot) is trained using a plurality of learning data so that the predetermined target device can make a decision or make a prediction by itself. Examples of learning algorithms are supervised learning, unsupervised learning, semi-supervised learning, or reinforcement learning, and the learning algorithm in the disclosure is not limited thereto except for being specified.

In addition, shape information corresponding to each of a plurality of objects may be stored in the memory 120 according to an embodiment of the disclosure.

The shape information may include a representative image of the corresponding object, information on whether the object corresponds to a typical object or an atypical object, and an image viewed from multiple angles of an object.

The image viewed from multiple angles may include an image viewed from the front of the object (e.g., front view), an image viewed from the side (e.g., side view), an image viewed from the above of the object (e.g., top view), or the like. However, this is an embodiment and is not limited thereto. The representative image of an object may refer to any one of the plurality of images viewed from multiple angles, and may refer to any one of a plurality of images obtained by web crawling an image on an object.

Information on whether an object corresponds to a typical object or an atypical object may mean that whether the object corresponds to an object having a typical shape or a fixed shape (or a constant shape) in which a shape of the object is not changed, or an object corresponds to an object in which a shape of the object is not fixed. For example, a cup, a bowl, etc. may correspond to the typical object with a fixed shape, and liquid, cable, etc. may correspond to the atypical object without a fixed shape. A detailed description of the shape information corresponding to each of the plurality of objects will be additionally described in FIG. 5.

The processor 130 controls the overall operation of the robot vacuum cleaner 100.

According to an embodiment, the processor 130 may be implemented as a digital signal processor (DSP), a microprocessor, an artificial intelligence (AI) processor, or a timing controller (T-CON) that processes digital image signals. However, it is not limited thereto, and the processor may include one or more among a central processing unit (CPU), a micro controller unit (MCU), a micro processing unit (MPU), a controller, and an application processor (AP), a communication processor (CP), or an ARM processor, or may be defined in a corresponding term. In addition, the processor 130 may be implemented in a System on Chip (SoC) with a built-in processing algorithm, large scale integration (LSI), or field programmable gate array (FPGA).

The processor 130 according to an embodiment of the disclosure may input an image obtained through the camera 110 into an artificial intelligence model to identify an object included in an image. The processor 130 may obtain shape information corresponding to the identified object among shape information corresponding to each of the plurality of objects stored in the memory 120. The processor 130 may set a traveling path of the robot vacuum cleaner 100 based on the obtained shape information and size information related to the object. A detailed description of this will be made with reference to FIG. 3.

Figure 3:
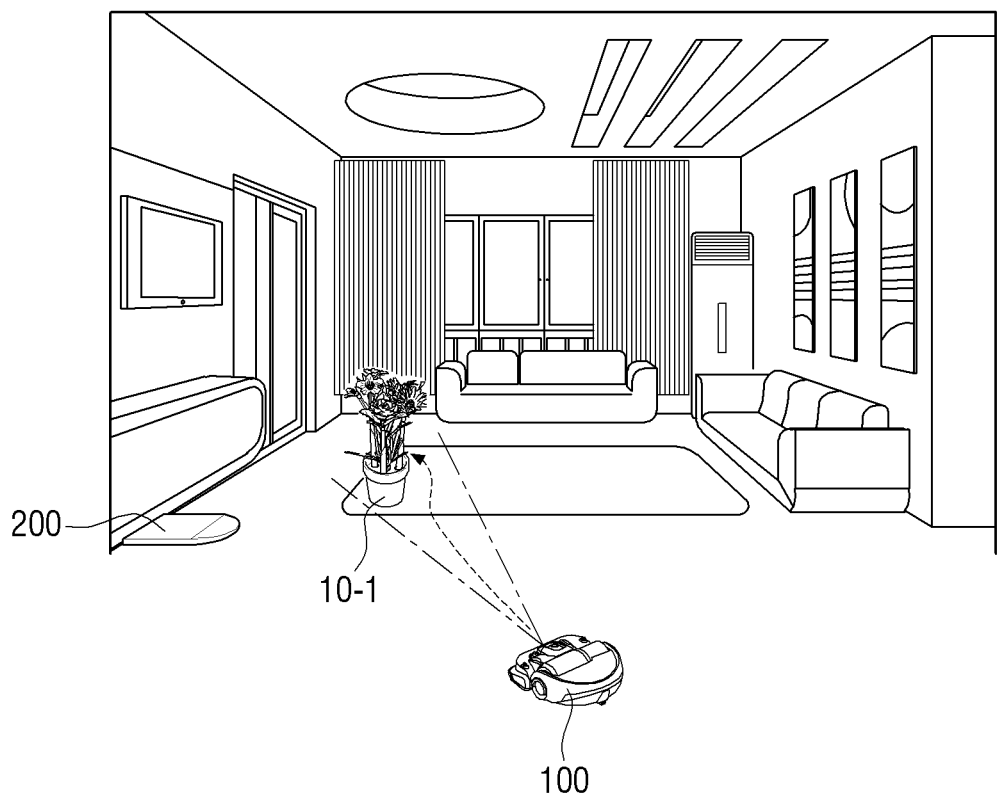
FIG. 3 is a view illustrating a traveling path of a robot according to an embodiment of the disclosure.

FIG. 3 is a view illustrating a traveling path of a robot according to an embodiment of the disclosure.

Referring to FIG. 3, the robot vacuum cleaner 100 according to an embodiment of the disclosure may operate in a home. The camera 110 provided in the robot vacuum cleaner 100 may obtain an image by photographing a front (or a predetermined direction) while the robot vacuum cleaner 100 is traveling. The processor 130 may input the obtained image into the artificial intelligence model to identify an object included in the image, for example, an object located in front of the robot vacuum cleaner 100. As an example, the processor 130 may identify a flower pot 10-1 included in an image using the artificial intelligence model. The processor 130 may obtain shape information corresponding to the flower pot 10-1 from among the plurality of shape information.

The shape information corresponding to the object may include a representative image of the corresponding object, information on whether the object corresponds to the typical or atypical object. For example, the shape information corresponding to the flower pot 10-1 may include a representative image of the flower pot 10-1, and the flower pot 10-1 may include information that the shape corresponds to the typical object.

The processor 130 may identify size information of the object based on an object image included in the image obtained by the camera 110. For example, the processor 130 may identify width and height information of the object. Referring to FIG. 3, the processor 130 may identify width and height information of the flower pot 10-1 based on an image of the flower pot 10-1 included in the image obtained by the camera 110.

The processor 130 may predict an actual shape of the object based on shape information corresponding to an identified object and size information related to the object. For example, if the identified object is a shape object, the processor 130 may identify a plane shape corresponding to the object. The processor 130 may predict an actual shape and size of the object based on the plane shape of the object and size information of the object, and may set a traveling path of the robot vacuum cleaner 100 based on the predicted shape and size. The plane shape of the object may refer to an image vied from the above (e.g., a top view) of a plurality of images viewed from multiple angles of the object. A detailed description of this will be made with reference to FIG. 4.

Figure 4:
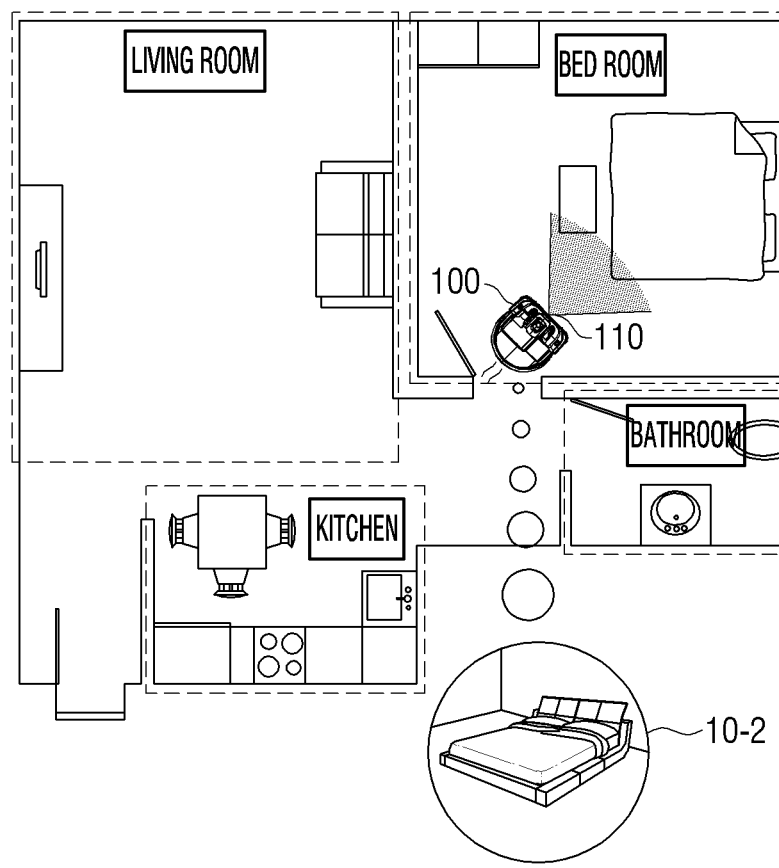
FIG. 4 is a view illustrating shape information corresponding to an object according to an embodiment of the disclosure.

FIG. 4 is a view illustrating shape information corresponding to an object according to an embodiment of the disclosure.

Referring to FIG. 4, the processor 130 may identify an object based on an image obtained through the camera 110. For example, the processor 130 may identify a bed 10-2 disposed in a bedroom in the home.

The processor 130 may obtain shape information corresponding to the identified object. Referring to FIG. 4, the processor 130 may obtain shape information corresponding to the bed 10-2 from among a plurality of shape information stored in the memory 120. In particular, the processor 130 may identify an object, for example, a plane shape corresponding to the bed 10-2 based on the shape information. The plane shape corresponding to the bed 10-2 may refer to an image viewed from above (e.g., a top view) of the bed 10-2 among a plurality of images viewed from multiple angles.

The processor 130 according to an embodiment may obtain size information corresponding to an object. For example, the processor 130 may obtain size information corresponding to the identified object based on size information for each shape information stored in the memory 120. For example, the memory 120 may store a plurality of size information for each shape information corresponding to the bed 10-2. The processor 130 may identify at least one of width, height, or length of the bed 10-2 based on the image obtained by the camera 110, and obtain size information of the bed 10-2 based on at least one of the identified width, height, or length among the plurality of size information included in the shape information of the bed 10-2.

Meanwhile, this is an embodiment, and the processor 130 may obtain size information of the bed 10-2 such as width, height, and length of the bed 10-2 based on the image obtained by the camera 110.

The processor 130 may identify a plane shape based on shape information corresponding to an object, and predict a plane shape of an actual object based on the identified plane shape and size information of the object. Referring to FIG. 4, the processor 130 may identify a plane shape (e.g., a square) of the bed 10-2 based on shape information corresponding to the bed 10-2, and predict (or obtain) a plane shape (or top-view) of the bed 10-2 so as to be close to the plane shape of the actual bed 10-2 (for example, the width, height and length of the actual bed 10-2) based on the identified plane shape and size information of the bed 10-2.

The processor 130 may set a traveling path for avoiding the corresponding object based on the plane shape of the object. For example, the processor 130 may set traveling path for cleaning and driving a space by avoiding the bed 10-2 based on the predicted plane shape of the bed 10-2.

According to an embodiment, the robot vacuum cleaner 100 may predict the plane shape of the object to be close to the actual plane shape based on the image obtained through the camera 110 without having a separate sensor for detecting the object, and set an optimal traveling path based on the predicted plane shape.

Meanwhile, the robot vacuum cleaner 100 according to an embodiment of the disclosure may set a traveling path for climbing (e.g., climbing over the corresponding object) the corresponding object in addition to the traveling path for avoiding the corresponding object based on information on the identified object. A detailed description of this will be made with reference to FIG. 5.

Figure 5:
FIG. 5 is a view illustrating shape information for each object and information on whether there is an object to avoid according to an embodiment of the disclosure.
Figure 5:
Figure 5:
Figure 5:
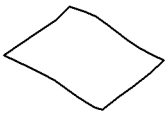
Figure 5:
Figure 5:

FIG. 5 is a view illustrating shape information for each object and information on whether there is an object to avoid according to an embodiment of the disclosure.

Referring to FIG. 5, the memory 120 according to an embodiment of the disclosure may store shape information for each object and information on whether there is an object to avoid.

For example, the memory 120 may store information on the type of object 10, a representative image for each object 10, whether contamination is caused by each object 10, and whether climbing is possible for each object 10. FIG. 5 is merely an example of the shape information of the object, and the shape information of the object may be implemented in various forms. In addition, the shape information corresponding to each of a plurality of objects may be received from an external server and stored in the memory 120.

Referring to FIG. 5, the processor 130 may identify the object 10 based on the image obtained by the camera 110 and obtain shape information corresponding to the identified object 10. For example, if the identified object 10 is a rug, the processor 130 may obtain shape information corresponding to the rug. The shape information corresponding to the rug may include information on a representative image of the rug, information on whether the rug corresponds to a typical object or an atypical object, whether the rug is likely to be contaminated, and whether the robot can climb the rug.

The information on whether climbing is possible included in the shape information may include, while the robot vacuum cleaner is traveling, information on whether the corresponding object corresponds to an object to be avoided, or whether it corresponds to an object to be climbed (e.g., an object that can be climbed over).

Referring to FIG. 5, since the shape information corresponding to the rug indicates that the rug corresponds to an object that can be climbed, if the identified object is a rug, the processor 130 may set a traveling path to climb the rug, rather than avoiding it.

As another example, if the identified object is a cup, shape information corresponding to the cup indicates that the cup does not correspond to an object to be climbed, so the processor 130 may set a traveling path of the robot vacuum cleaner 100 to avoid the cup.

Meanwhile, if the identified object corresponds to an object that can be climbed by the object (or corresponds to an object not to be avoided), the processor 130 according to an embodiment of the disclosure may change a cleaning mode of the robot vacuum cleaner 100 while climbing the corresponding object.

For example, a general cleaning mode of the robot vacuum cleaner 100 may perform a sucking operation to suck foreign materials and contaminants on the floor. If an object is sucked into the robot vacuum cleaner 100 due to the sucking operation while the robot vacuum cleaner 100 climbs the identified object, stop of traveling, damage, or failure of the robot vacuum cleaner 100 may be caused. So the processor 130 may change the cleaning mode of the robot vacuum cleaner 100 based on the identified object while the robot vacuum cleaner 100 climbs the object. For example, the processor 130 may stop the sucking operation of the robot vacuum cleaner 100 while climbing the identified object. As another example, the processor 130 may lower a degree of suction power of the robot vacuum cleaner 100 while climbing the object.

Figure 6:
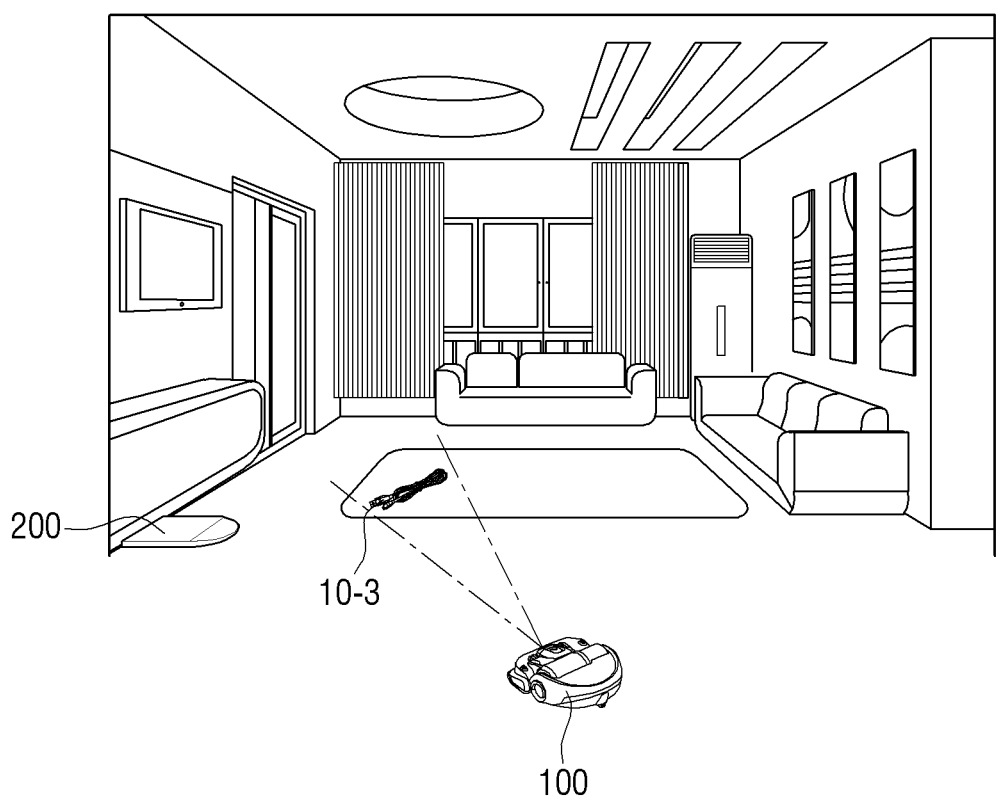
FIG. 6 is a view illustrating a traveling path of a robot vacuum cleaner according to another embodiment of the disclosure.

FIG. 6 is a view illustrating a traveling path of a robot vacuum cleaner according to another embodiment of the disclosure.

Referring to FIG. 6, the robot vacuum cleaner 100 according to an embodiment of the disclosure may further include an obstacle detecting sensor. According to an embodiment, if it is failed to obtain a plane shape corresponding to an object, the processor 130 may set a traveling path for avoiding the object based on sensing data of the obstacle detecting sensor.

For example, the processor 130 may input an image obtained by the camera 110 into an artificial intelligence model to identify an object included in the image. The processor 130 may obtain shape information corresponding to the identified object among a plurality of shape information for each object. The obtained shape information may include information on whether the identified object corresponds to a typical object or an atypical object.

According to an embodiment, if the identified object corresponds to the atypical object, the processor 130 may set a traveling path for avoiding the object based on sensing data of the obstacle detecting sensor.

In other words, since the atypical object refer s to an object in which a shape of an object is not fixed, if the identified object is an atypical object, the processor 130 may not obtain a plane shape (i.e., a top view) for the identified object. In this case, the processor 130 may set a traveling path for avoiding the identified object based on the sensing data of the obstacle detecting sensor.

Referring to FIG. 6, a cable 10-3 is an example of an atypical object. When the cable 10-3 is identified, the processor 130 may set a traveling path for avoiding the cable 10-3 in consideration of a sensing data obtained by the obstacle detecting sensor in addition to the image obtained by the camera 110. However, this is not limited thereto. For example, if the identified object is identified to correspond to the atypical object, the processor 130 may obtain at least one among width, height, or length of the corresponding object based on the image to predict a maximum size. The processor 130 may set a traveling path based on the predicted size of the object.

Figure 7:
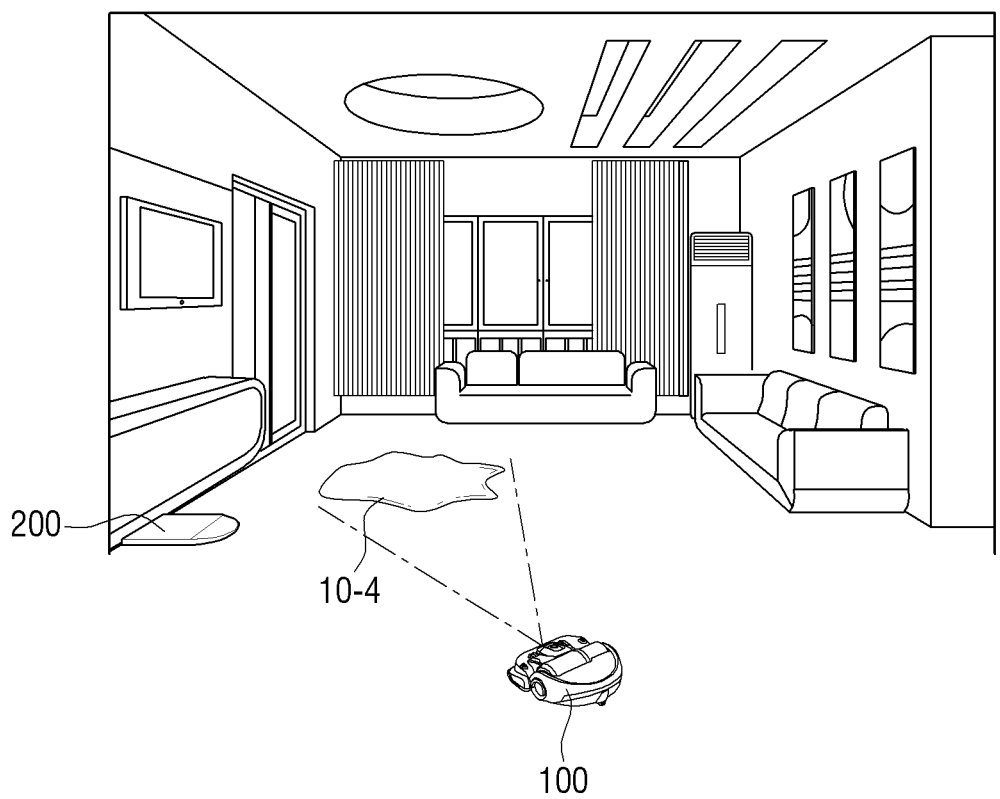
FIG. 7 is a view illustrating a traveling path of a robot vacuum cleaner according to another embodiment of the disclosure.

FIG. 7 is a view illustrating a traveling path of a robot vacuum cleaner according to another embodiment of the disclosure.

Referring to FIG. 7, the processor 130 according to an embodiment of the disclosure may identify whether a corresponding object corresponds to an object that is likely to cause contamination based on shape information corresponding to the identified object.

Referring back to FIG. 5, the memory 120 may store information on the type of object 10, a representative image for each object 10, whether contamination is caused for each object 10, and whether climbing is possible for each object 10.

Whether contamination is caused for each object 10 does not correspond to whether the corresponding object is a target to avoid, but may refer to whether there is a possibility that a contamination area may extend when the robot vacuum cleaner 100 climbs the corresponding object.

For example, referring to FIG. 7, since liquid spill 10-4 is not an object to be avoided, the processor 130 may control the robot vacuum cleaner 100 to climb and travel the liquid spill 10-4. In this case, there is a concern that a range of contamination due to the liquid spill 10-4 may extend in a space due to a driver (e.g., a wheel, etc.) located at the bottom of the robot vacuum cleaner 100, a suction unit, or the like. As another example, excrement of a pet is not an object to be avoided, but may be an object that is concerned about causing contamination.

When an object is identified as a contamination-causing object based on shape information of the object, the processor 130 may set a traveling path for avoiding the object.

Figure 8:
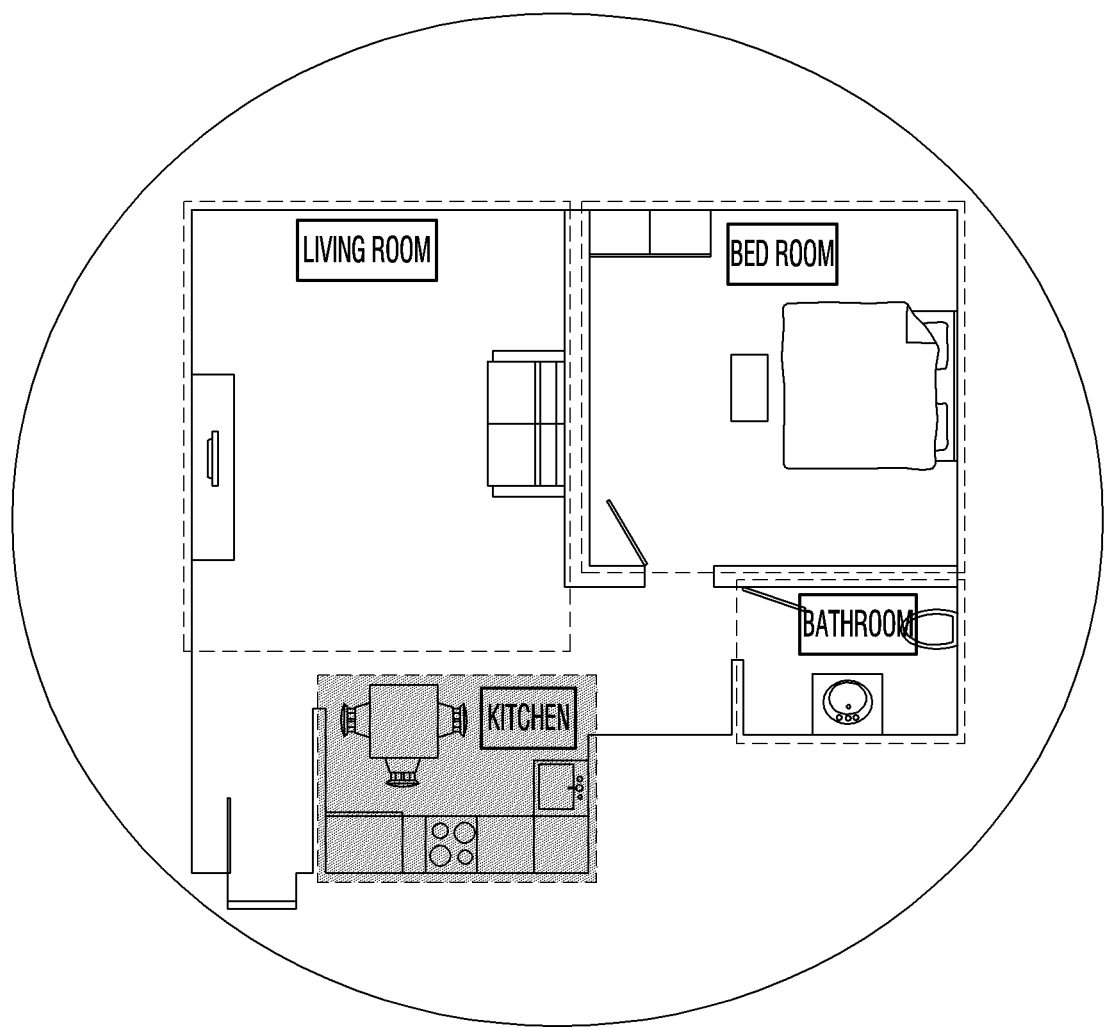
FIG. 8 is a view illustrating a method of obtaining a plan view of a space in which a robot vacuum cleaner is located according to an embodiment of the disclosure.

FIG. 8 is a view illustrating a method of obtaining a plan view of a space in which a robot vacuum cleaner is located according to an embodiment of the disclosure.

Referring to FIG. 8, the robot vacuum cleaner 100 may photograph various images while traveling areas on a map, and input the photographed images to a plurality of artificial intelligence models to recognize objects located within the area.

In addition, the robot vacuum cleaner 100 may divide the space into a plurality of areas. For example, the robot vacuum cleaner 100 may identify a point where there is a dividing line or threshold on the floor, a point where a movable width is narrowed, a point where there is a wall, a point where the wall starts, a point where the wall ends, a point where there is a door, or the like based on the image obtained by the camera 110. The processor 130 may divide the space (e.g., a home) into a plurality of areas (e.g., a living room, a bedroom, a bathroom, a kitchen, etc.) by using the identified point as a boundary between the areas. Hereinafter, for convenience of description, it is assumed that an area refers to a lower concept and a space refers to an upper concept, that is, a set of areas.

Meanwhile, the processor 130 according to an embodiment of the disclosure may use information on an object located within an area in order to obtain area information corresponding to each of a plurality of areas. The area information may refer to information for identifying each of the plurality of areas. The area information may be composed of an identification name, an identification number, etc. indicating each of the plurality of areas. In addition, the area information may include information on the use of each of the plurality of areas. For example, the plurality of areas may be defined as a living room, a bathroom, a bedroom, or the like by the area information. In addition, information on the object may include name, type, etc. of an object.

A detailed description will be described with reference to FIG. 9.

FIG. 9 is a view illustrating a method of acquiring information on a space in which a robot vacuum cleaner is located according to an embodiment of the disclosure.

Referring to FIG. 9, the processor 130 according to an embodiment of the disclosure may obtain area information corresponding to a corresponding area based on an object identified within the area. The area information may include information on a purpose of the area, the name of the area, or the like.

For example, when only a bookshelf is identified in a first area, the processor 130 may identify the first area as a study room. As another example, when a bed and a bookcase are identified in a second area, the processor 130 may identify the second area as a bedroom. However, these are only examples. Meanwhile, according to another example, when only a television (TV) is identified in a third area, the third area may be a study room or a living room, and thus obtaining area information using only a table as shown in FIG. 9 is somewhat less reliable or unclear.

Accordingly, the processor 130 according to an embodiment of the disclosure may obtain prediction information corresponding to a corresponding area by using weight information for each area.

The memory 120 according to an embodiment may store first weight information for each object corresponding to the first area and second weight information for each object corresponding to the second area. The weight information may be defined as the Table 1 below.

TABLE 1

| Estimated area | 0 Living room | 1 Study room | 2 Room | 3 Kitchen | 4 Bedroom | 5 bathroom |
| --- | --- | --- | --- | --- | --- | --- |
| 0 Air conditioner | 1 | 0.8 | 0.8 | 0.5 | 0.8 | 0.1 |
| 1 Refrigerator | 0.2 | 0.1 | 0.1 | 1 | 0.1 | 0.1 |
| 2 TV | 1 | 0.5 | 0.8 | 0.7 | 0.9 | 0.1 |
| 3 Bed | 0.2 | 0.2 | 0.5 | 0.1 | 1 | 0.1 |
| 4 Sofa | 1 | 0.8 | 0.8 | 0.1 | 0.4 | 0.1 |
| 5 Bookshelf | 0.8 | 1 | 0.7 | 0.1 | 0.3 | 0.1 |
| 6 Washing machine | 0.2 | 0.1 | 0.2 | 0.3 | 0.2 | 0.8 |

The processor 130 according to an embodiment of the disclosure may obtain area prediction information for each of a plurality of areas by using Table 1 and Equation 1 below to an object identified in areas.

$$\text{Area}(j) = \sum_{i=0}^{m} \begin{cases} k\_obj[i][j] & \exists\, Obj[i] \in \text{AREA} \\ 0 & \text{otherwise.} \end{cases} \quad \text{Equation 1}$$

$$\text{Find\_Area}(j) = \text{MAX}(\text{Area}(j)),\ 0 \le j \le n$$

As an example, when a plurality of objects are identified in an image obtained by a camera, that is, when a plurality of objects are identified within a specific area, the processor 130 may apply first weight information to each of the plurality of objects, and obtain first space prediction information. The processor 130 may apply second weight information to each of the plurality of objects, and obtain second space prediction information.

For example, it may assume that a TV and a sofa are identified in a specific area. In this case, the processor 130 may obtain area prediction information corresponding to each of the plurality of areas as shown in Table 2 below based on Table 1 and Equation 1.

TABLE 2

| Estimated area | 0 Living room | 1 Study room | 2 Room | 3 Kitchen | 4 Bedroom | 5 bathroom |
| --- | --- | --- | --- | --- | --- | --- |
| 0 Air conditioner | 0 | 0 | 0 | 0 | 0 | 0 |
| 1 Refrigerator | 0 | 0 | 0 | 0 | 0 | 0 |
| 2 TV | One | 0.5 | 0.8 | 0.7 | 0.9 | 0.1 |
| 3 Bed | 0 | 0 | 0 | 0 | 0 | 0 |
| 4 Sofa | One | 0.8 | 0.8 | 0.1 | 0.4 | 0.1 |
| 5 Bookshelf | 0 | 0 | 0 | 0 | 0 | 0 |
| 6 Washing machine | 0 | 0 | 0 | 0 | 0 | 0 |
| Sum | | 1.3 | 1.6 | 0.8 | 1.3 | 0.2 |

Since TVs and sofas are often located in a living room area relative to other areas, the first weight information corresponding to the living room may give a high weight to the TV and sofa, and a small weight to a washing machine.

The processor 130 may identify an area in which the robot vacuum cleaner 100 is located as either the first area or the second area based on the first area prediction information and the second area prediction information.

Referring to Table 2, when a TV and a sofa are identified in a specific area, the processor 130 may obtain 2 as area prediction information in a living room area and 0.2 as area prediction information in a bathroom area. The processor 130 may identify the specific area as a living room area.

Figure 10:
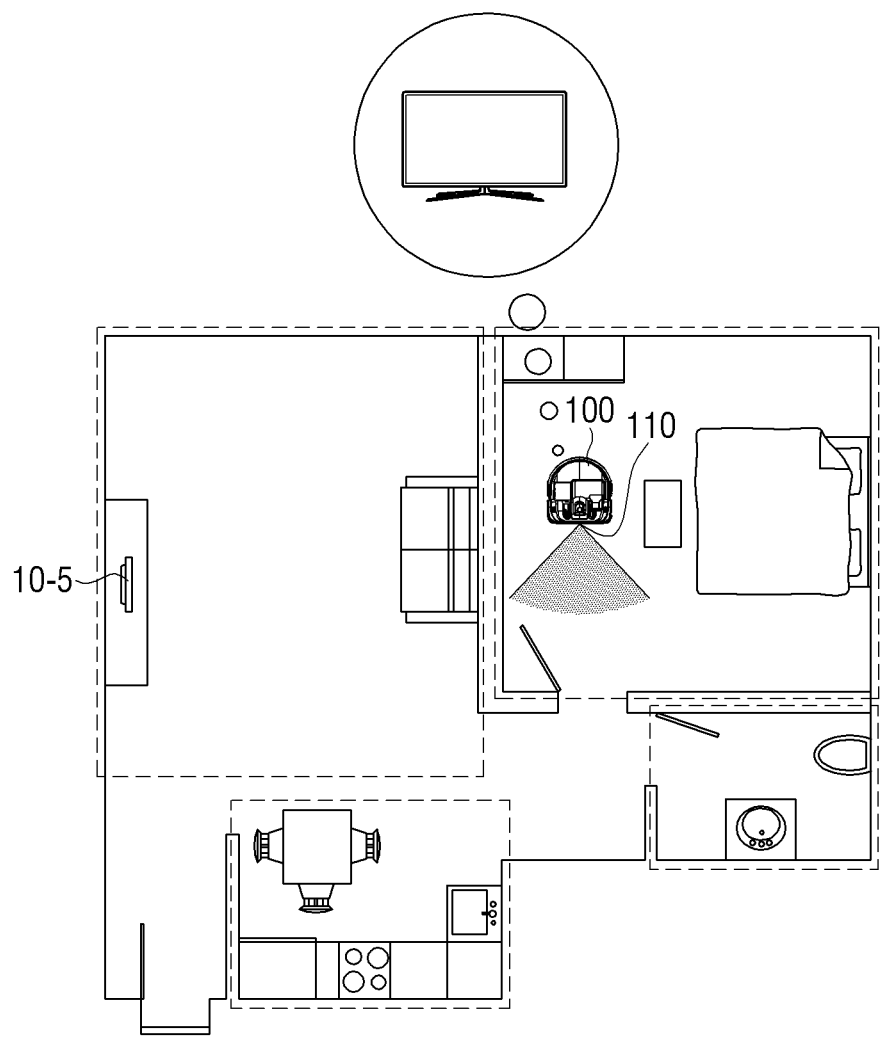
FIG. 10 is a view illustrating a robot vacuum cleaner moving to a location of a specific object according to an embodiment of the disclosure.

FIG. 10 is a view illustrating a robot vacuum cleaner moving to a location of a specific object according to an embodiment of the disclosure.

Referring to FIG. 10, the processor 130 according to an embodiment of the disclosure may assign area information to each of a plurality of areas included in a space. For example, a first area where a TV and a sofa are identified may be identified as a living room, and a second area where a basin is identified may be identified as a bathroom. As another example, a third area where a dressing table and a bed are identified may be identified as a bedroom.

A plan view of an area and a plan view of a plurality of objects illustrated in FIG. 10 may be referred to as map information of the space. The robot vacuum cleaner 100 according to an embodiment may transmit map information of the space to a server or transmit it to an external device (e.g., a user terminal device) to provide it to a user.

Meanwhile, the robot vacuum cleaner 100 according to an embodiment of the disclosure may receive a user command. As an example, the user command may be a command indicating a specific object. The user command may be a voice command, a text command, or a control command received from a remote control device or an external device. As another example, a user terminal device may display map information of the space, and the robot vacuum cleaner 100 may receive the user command indicating a specific object through the user terminal device.

For example, when the user command indicating a specific object (e.g., "clean the surroundings of the TV") is received, the processor 130 may identify a location of the object corresponding to the user command based on the map information of the space. For example, the processor 130 may identify a TV 10-5 included in "clean the surroundings of the TV" by performing voice recognition on the user command. The processor 130 may obtain location information of the TV 10-5 in the space based on a plan view of the area and a plan shape of at least one object located in the area. The processor 130 may move the robot vacuum cleaner 100 to the TV 10-5 based on the obtained location information of the TV 10-5.

Specifically, the processor 130 may control the robot vacuum cleaner 100 to change the surroundings of the TV 10-5 according to a user command.

Meanwhile, the processor 130 according to an embodiment of the disclosure may move the robot vacuum cleaner 100 to a location of an object corresponding to a user command and perform a cleaning operation based on shape information of the object. For example, the processor 130 may set an optimal traveling path for avoiding the corresponding object based on the shape information of the object corresponding to the user command, and move the robot vacuum cleaner 100 to clean the surroundings of the corresponding object without collision with the corresponding object based on the set traveling path (i.e., by avoiding the object).

For example, the processor 130 may obtain shape information corresponding to the TV 10-5 from shape information for each of the plurality of the objects according to the user command, and obtain a traveling path for avoiding the TV 10-5 based on the shape information corresponding to the TV 10-5. The processor 130 may control the robot vacuum cleaner 100 to avoid the TV 10-5 and efficiently clean the surroundings of the TV 10-5.

Figure 11:
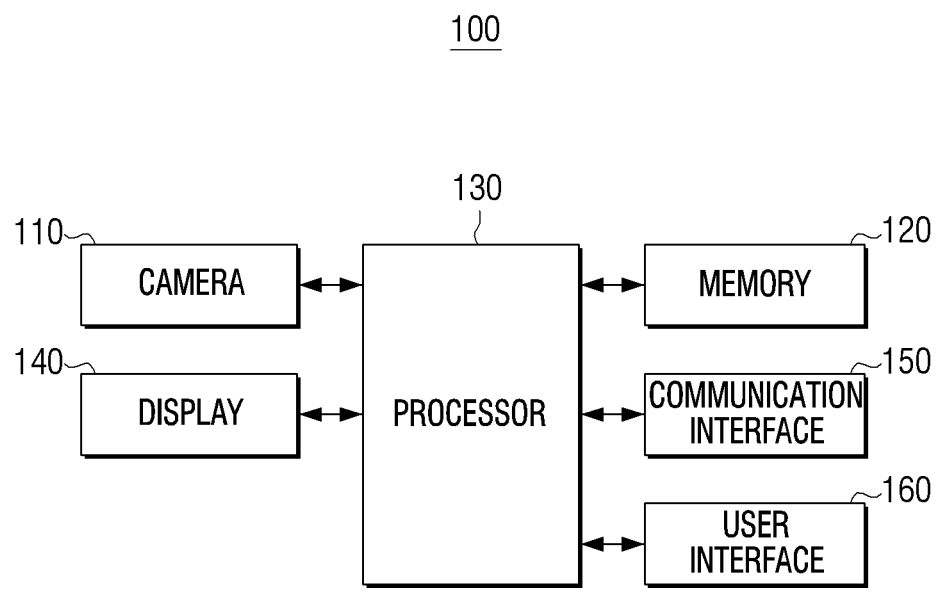
FIG. 11 is a detailed block diagram of a robot vacuum cleaner according to an embodiment of the disclosure.

FIG. 11 is a detailed block diagram of a robot vacuum cleaner according to an embodiment of the disclosure.

Referring to FIG. 11, the robot vacuum cleaner 100 according to an embodiment of the disclosure may include a camera 110, a memory 120, a processor 130, a display 140, a communication interface 150, and a user interface 160.

The camera 110 may be implemented as an RGB camera, a 3D camera, or the like. The 3D camera may be implemented as a TOF camera including a time of flight (TOF) sensor and an infrared light. The 3D camera may include an infrared (IR) stereo sensor. The camera sensor may be one that uses a charge-coupled device (CCD), a complementary metal-oxide-semiconductor (CMOS), or the like, but is not limited thereto. When the camera 110 includes a CCD, the CCD may be implemented as a Red/Green/Blue (RGB) CCD, an infrared (IR) CCD, or the like.

The memory 120 may store an artificial intelligence model learned to identify an object in an input image.

Meanwhile, the memory 120 may include ROM, RAM (ex. dynamic RAM (DRAM), synchronous DRAM (SDRAM), Double data rate SDRAM (DDR SDRAM)), or the like, and may be implemented together with the processor 130.

Functions related to artificial intelligence according to the disclosure are operated through the processor 130 and the memory 120. The processor 130 may be composed of one or a plurality of processors. In this case, one or more processors may be a general-purpose processor such as a CPU, AP, digital signal processor (DSP), etc., or a graphics-only processor such as a GPU, a vision processing unit (VPU), or an artificial intelligence-only processor such as an NPU. One or more processors control to process input data according to a predefined operation rule or an artificial intelligence model stored in the memory 120. Alternatively, when one or more processors are the artificial intelligence-only processors, the artificial intelligence-only processor may be designed with a hardware structure specialized for processing a specific artificial intelligence model.

A predefined motion rule or an artificial intelligence model is characterized by being generated through learning. The generating through learning means that a basic artificial intelligence model is learned using a plurality of learning data by a learning algorithm, so that the predefined motion rule or an artificial intelligence model set to perform a desired characteristic (or purpose) is generated. Such learning may be performed in the device itself on which the artificial intelligence according to the disclosure is performed, or may be performed through a separate server and/or system. Examples of the learning algorithm include supervised learning, unsupervised learning, semi-supervised learning, or reinforcement learning, but are not limited to the examples described above.

The artificial intelligence model may be composed of a plurality of neural network layers. Each of the plurality of neural network layers has a plurality of weight values, and performs a neural network operation through an operation between an operation result of a previous layer and a plurality of weight values. The plurality of weight values of the plurality of neural network layers may be optimized by the learning result of the artificial intelligence model. For example, a plurality of weight values may be updated to reduce or minimize a loss value or a cost value obtained from the artificial intelligence model during the learning process. The artificial neural network may include a deep neural network (DNN), for example, convolutional neural network (CNN), deep neural network (DNN), recurrent neural network (RNN), restricted Boltzmann machine (RBM), deep belief network (DBN), bidirectional recurrent deep neural network (BRDNN), or deep Q-Networks, or the like, but is not limited thereto.

The display 140 may be implemented as a display including a self-luminous element or a display including a non-luminescent element and a backlight. For example, the display may be implemented in various types of displays such as Liquid Crystal Display (LCD), Organic Light Emitting Diodes (OLED) display, Light Emitting Diodes (LED), micro LED, Mini LED, Plasma Display Panel (PDP), Quantum dot (QD) display, Quantum dot light-emitting diodes (QLED), or the like. The display 140 may include a driving circuit, a backlight unit, or the like which may be implemented in forms such as an a-si TFT, a low temperature poly silicon (LTPS) TFT, an organic TFT (OTFT), or the like. Meanwhile, the display 140 may be implemented as a touch screen combined with a touch sensor, a flexible display, a rollable display, a 3D display, a display in which a plurality of display modules are physically connected, or the like. The processor 130 may control the display 140 to output status information of the robot vacuum cleaner 100 obtained according to the various embodiments described above. The status information may include various information related to driving of the robot vacuum cleaner 100, such as a cleaning mode of the robot vacuum cleaner 100, information related to a battery, information on whether to return to a docking station 200, or the like.

The communication interface 150 is a component for the robot vacuum cleaner 100 to communicate with at least one external device to exchange signals/data. For this, the communication interface 150 may include a circuit.

The communication interface 150 may include a wireless communication module, a wired communication module, or the like.

The wireless communication module may include at least one of a Wi-Fi communication module, a Bluetooth module, an infrared data association (IrDA) module, a third generation (3G) mobile communication module, a fourth generation (4G) mobile communication module, a 4G long term evolution (LTE) communication module.

The wired communication module may be implemented as a wired port such as a Thunderbolt port, a USB port, or the like.

The user interface 160 may include one or more buttons, a keyboard, a mouse, or the like. In addition, the user interface 160 may include a touch panel implemented together with a display (not shown) or a separate touch pad (not shown).

The user interface 160 may include a microphone to receive a user's command or information by voice, or may be implemented together with the camera 110 to recognize the user's command or information in a motion form.

Figure 12:
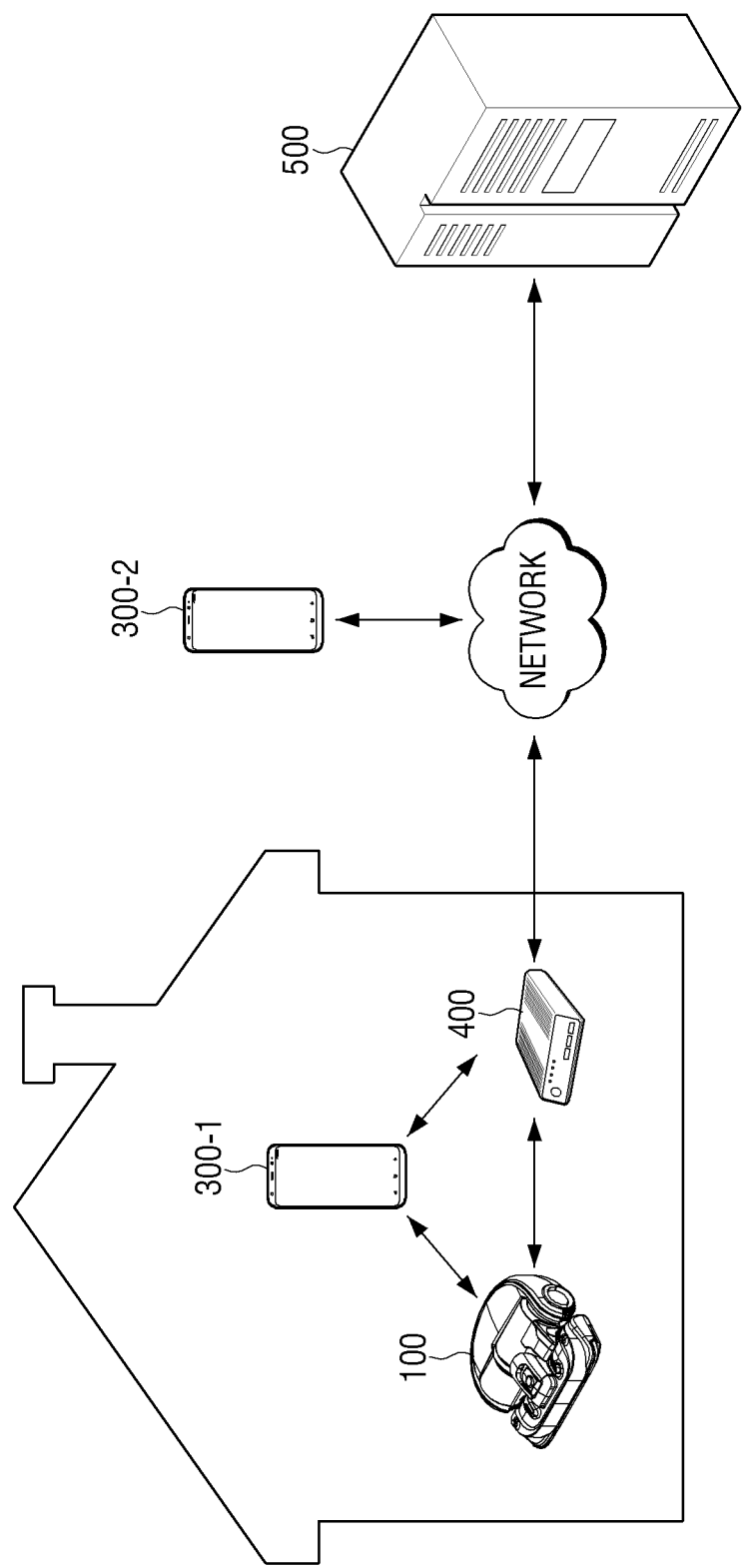
FIG. 12 is a view illustrating a robot vacuum cleaner that communicates with an external server according to an embodiment of the disclosure.

FIG. 12 is a view illustrating a robot vacuum cleaner that communicates with an external server according to an embodiment of the disclosure.

Referring to FIG. 12, the robot vacuum cleaner 100 may communicate with external devices 300-1 and 300-2, which may be smartphones, and a server device 500. In this case, the robot vacuum cleaner 100 may communicate with the external devices 300-1, 300-2 and 500 through a relay device 400 configured with a router or the like.

For example, when an area in which the robot vacuum cleaner 100 is located is identified as either a first area or a second area, the processor 130 may control the communication interface 150 to provide identification information (e.g., area information) on the identified area, a plan view of the identified area, and a plane shape corresponding to each of the plurality of objects located in the area to an external server or the external devices 300-1 and 300-2.

In addition, the robot vacuum cleaner 100 may move to any one of a plurality of areas included in a space in which the robot vacuum cleaner 100 is located according to a control signal received from the external device 300-1, which may be a smartphone, or the external device 300-2, or move to any one of the plurality of objects located in the space.

Figure 13:
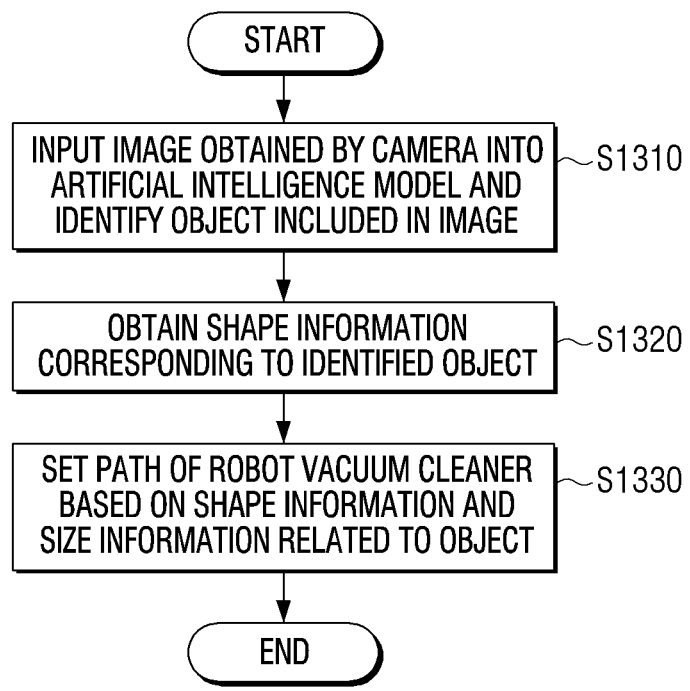
FIG. 13 is a flowchart illustrating a method of controlling a robot vacuum cleaner according to an embodiment of the disclosure.

FIG. 13 is a flowchart illustrating a method of controlling a robot vacuum cleaner according to an embodiment of the disclosure.

Referring to FIG. 13, a method of controlling a robot vacuum cleaner including an artificial intelligence model trained to identify an object in an input image and shape information corresponding to each of a plurality of objects first inputs an image obtained by a camera to the artificial intelligence model and identify an object included in the image in operation S1310.

Shape information corresponding to the identified object is obtained from among the plurality of shape information in operation S1320.

A traveling path of the robot vacuum cleaner is set based on the shape information and size information related to the object in operation S1330.

The robot vacuum cleaner may further include size information for each shape information. The operation S1320 that obtains shape information, according to an embodiment, may include obtaining size information corresponding to shape information based on the image, or obtaining size information corresponding to shape information based on the size information stored in a memory.

The operation S1330 that sets a traveling path includes identifying a plane shape corresponding to an object based on the shape information of the object, and setting a traveling path for avoiding the object based on a plane shape of the object.

In addition, the operation S1330 of setting the traveling path may include setting a traveling path for avoiding the object based on sensing data of an obstacle detecting sensor, if it is fail to obtain a plane shape corresponding to the object.

In addition, the robot vacuum cleaner may further include information on whether there is an object to avoid by a plurality of objects, and the operation S1330 of setting a traveling path according to an embodiment may include setting a traveling path to climb an object, if it is identified that the object is not a target to avoid based on the information on whether there is an object to avoid.

The method of controlling according to an embodiment may further include stopping a suction operation of the robot vacuum cleaner while climbing the object.

In addition, the robot vacuum cleaner may further store first weight information for each object corresponding to the first area and second weight information for each object corresponding to the second area, and the method of controlling according to an embodiment may further include obtaining first area prediction information by applying first weight value information to each of the plurality of objects, obtaining second area prediction information by applying second weight information to each of the plurality of objects, and identifying an area in which the robot vacuum cleaner is located as either the first area or the second area based on the first area prediction information and the second area prediction information.

When the area in which the robot vacuum cleaner is located is identified as either the first area or the second area, the method of controlling, according to an embodiment, may include transmitting identification information on the identified area, a plan view for the identified area, and a plan shape corresponding to each of the plurality of objects located in the area to the external server.

In addition, when a user command that indicates an object is received, the method of controlling, according to an embodiment, may include identifying an object corresponding to the user command among objects identified in the image, and driving the robot vacuum cleaner so that the robot vacuum cleaner moves to a location of the identified object based on a plan view of the area where the robot vacuum cleaner is located, and a plane shape of at least one object.

The method of controlling, according to an embodiment, may further include obtaining shape information corresponding to the identified object among a plurality of shape information, and setting a traveling path for cleaning the surroundings of the object based on the shape information and size information related to the object.

However, the various embodiments of the disclosure may be applied not only to a robot vacuum cleaner but also to all movable electronic devices.

Various embodiments described above may be embodied in a recording medium that may be read by a computer or a similar apparatus to the computer by using software, hardware, or a combination thereof. In some cases, the embodiments described herein may be implemented by the processor itself. In a software configuration, various embodiments described in the specification such as a procedure and a function may be embodied as separate software modules. The software modules may respectively perform one or more functions and operations described in the specification.

Meanwhile, computer instructions for performing the processing operation of the robot vacuum cleaner according to various embodiments of the disclosure described above may be stored in a non-transitory computer-readable medium. When a computer instruction stored in the non-transitory computer-readable medium is executed by a processor of a specific device, it allows a specific device to perform the processing operation in the robot vacuum cleaner 100 according to the above-described various embodiments.

The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a camera;
a memory configured to store an artificial intelligence model trained to identify an image from an input image, shape information corresponding to each of a plurality of objects, and information on an object to be avoided, first weight value information for each object corresponding to a first area, and second weight value information for each object corresponding to a second area; and
a processor configured to control the electronic apparatus by being connected to the camera and the memory, wherein the processor is further configured to:
input an image obtained by the camera to the artificial intelligence model to identify an object included in the image,
obtain shape information corresponding to the identified object among the shape information stored in the memory,
based on the identified object corresponding to the object to be avoided based on the information, identify whether the identified object is an object causing contamination based on the shape information,
based on the identified object corresponding to the object to be avoided or the identified object corresponding to an object causing contamination, set a traveling path of the electronic apparatus based on the shape information and size information related to the identified object, and
based on the identified object not corresponding to the object to be avoided or the identified object not corresponding to the object causing contamination, set the traveling path to climb the identified object, and wherein the processor is further configured to:
based on a plurality of objects being identified from the image obtained by the camera, apply the first weight value information to each of the plurality of objects to obtain first area prediction information,
apply the second weight value information to each of the plurality of objects to obtain second area prediction information, and
identify an area in which the electronic apparatus is located as any one of the first area or the second area based on the first area prediction information and the second area prediction information.

2. The electronic apparatus of claim 1,
wherein the memory is further configured to store size information for each of the shape information, and
wherein the processor is further configured to obtain size information corresponding to the shape information based on the image, or obtain size information corresponding to the shape information based on the size information stored in the memory.

3. The electronic apparatus of claim 1, wherein the processor is further configured to:
identify a plan shape corresponding to the identified object based on the shape information of the identified object, and
set the traveling path for avoiding the identified object based on the plan shape of the identified object.

4. The electronic apparatus of claim 1, further comprising:
an obstacle detecting sensor, wherein the processor is further configured to set the traveling path for avoiding the identified object based on sensing data of the obstacle detecting sensor, based on a plan view corresponding to the identified object being failed to be obtained.

5. The electronic apparatus of claim 1, wherein the processor is further configured to stop a suction operation of the electronic apparatus while climbing the identified object.

6. The electronic apparatus of claim 1, further comprising:
a communication circuitry,
wherein the processor is further configured to, based on the area in which the electronic apparatus is located being identified as any one of the first area or the second area, control the communication circuitry to transmit identification information on the identified area, a plan view of the identified area, and a plan shape corresponding to each of the plurality of objects located in the area to an external server.

7. The electronic apparatus of claim 1, wherein the processor is further configured to:
based on receiving a user command that indicates an object, identify an object corresponding to the user command among the objects identified from the image, and
drive the electronic apparatus such that the electronic apparatus moves to a location of the identified object based on a plan view with respect to an area in which the electronic apparatus is located and a plan shape with respect to at least one object located in the area.

8. The electronic apparatus of claim 7, wherein the processor is further configured to:
obtain shape information corresponding to the identified object among the shape information stored in the memory, and
set a traveling path for cleaning surroundings of the identified object based on the shape information and size information related to the identified object.

9. The electronic apparatus of claim 1, wherein the processor is further configured to:
control the electronic apparatus to perform a cleaning operation based on the set traveling path.

10. A method of controlling an electronic apparatus including an artificial intelligence model trained to identify an object from an input image, the method comprising:
inputting an image obtained by a camera to the artificial intelligence model to identify an object included in the image;
obtaining shape information corresponding to the identified object among a plurality of shape information;
based on the identified object corresponding to an object to be avoided based on information on the object to be avoided, identifying whether the identified object is an object causing contamination based on the shape information;
based on the identified object corresponding to the object to be avoided or the identified object corresponding to an object causing contamination, setting a traveling path of the electronic apparatus based on the obtained shape information and size information related to the identified object; and based on the identified object not corresponding to the object to be avoided or the identified object not corresponding to the object causing contamination, setting the traveling path to climb the identified object, wherein the method further comprises:
based on a plurality of objects being identified from the image obtained by the camera, applying first weight value information for each object corresponding to a first area, to each of the plurality of objects to obtain first area prediction information;

applying second weight value information for each object corresponding to a second area, to each of the plurality of objects to obtain second area prediction information; and identifying an area in which the electronic apparatus is located as any one of the first area or the second area based on the first area prediction information and the second area prediction information.

11. The method of claim 10, further comprising:
storing size information for each shape of the plurality of shape information,
wherein the obtaining of the shape information comprises obtaining size information corresponding to the shape information based on the image, or obtaining size information corresponding to the shape information based on the size information stored in a memory.

12. The method of claim 10, wherein the setting of the traveling path comprises:
identifying a plan shape corresponding to the identified object based on the obtained shape information of the object, and
setting the traveling path for avoiding the object based on the plan shape of the object.

13. The method of claim 10, wherein the setting of the traveling path comprises setting the traveling path to avoid the object based on sensing data of an obstacle detecting sensor, based failing to obtain a plan view corresponding to the object.

14. The method of claim 10, further comprising:
stopping a suction operation of the electronic apparatus while climbing the identified object.

15. The method of claim 10, further comprising:
based on the area in which the electronic apparatus is located being identified as any one of the first area or the second area, transmitting, to an external server, identification information on the identified area, a plan view of the identified area, and a plan shape corresponding to each of the plurality of objects located in the area.

16. The method of claim 10, further comprising:
based on receiving a user command that indicates an object, identifying an object corresponding to the user command among the objects identified from the image; and
driving the electronic apparatus such that the electronic apparatus moves to a location of the identified object based on a plan view with respect to an area in which the electronic apparatus is located and a plan shape with respect to at least one object located in the area.

17. The method of claim 16, further comprising:
obtaining shape information corresponding to the identified object among the shape information stored in a memory; and
setting a traveling path for cleaning surroundings of the identified object based on the shape information and size information related to the identified object.

18. The method of claim 10, further comprising:
controlling the electronic apparatus to perform a cleaning operation based on the set traveling path.

* * * * *